US011144592B2

(12) United States Patent
Watkins et al.

(10) Patent No.: US 11,144,592 B2
(45) Date of Patent: Oct. 12, 2021

(54) EXTENDABLE JSON CONFIGURATION ARCHITECTURE

(71) Applicants: Amber Joy Watkins, Longmont, CO (US); Marquis G. Waller, Beverly, OH (US); James Douglas Jungbauer, Jr., Westminster, CO (US)

(72) Inventors: Amber Joy Watkins, Longmont, CO (US); Marquis G. Waller, Beverly, OH (US); James Douglas Jungbauer, Jr., Westminster, CO (US)

(73) Assignee: Ricoh Company, Ltd., Tokyo (JP)

( * ) Notice: Subject to any disclaimer, the term of this patent is extended or adjusted under 35 U.S.C. 154(b) by 998 days.

(21) Appl. No.: 15/336,622

(22) Filed: Oct. 27, 2016

(65) Prior Publication Data

US 2018/0121562 A1 May 3, 2018

(51) Int. Cl.
*G06F 16/80* (2019.01)
*G06F 8/38* (2018.01)

(52) U.S. Cl.
CPC ............ *G06F 16/80* (2019.01); *G06F 8/38* (2013.01)

(58) Field of Classification Search
CPC ...... G06F 17/30908; G06F 8/38; G06F 16/80; G06F 16/38
USPC ........................................................ 707/755
See application file for complete search history.

(56) References Cited

U.S. PATENT DOCUMENTS

| 7,181,686 | B1* | 2/2007 | Bahrs ................. G06F 8/38 715/210 |
| 9,792,821 | B1* | 10/2017 | Yalla ................. G08G 1/167 |
| 2014/0164895 | A1* | 6/2014 | Matheson ............ G06F 17/246 715/212 |
| 2014/0222553 | A1* | 8/2014 | Bowman ............ G06Q 30/0276 705/14.45 |
| 2014/0365668 | A1* | 12/2014 | Jaisinghani ......... H04L 41/0816 709/226 |
| 2015/0040025 | A1* | 2/2015 | Deklich ............... G06F 15/177 715/744 |
| 2015/0304186 | A1* | 10/2015 | O'Sullivan ....... G06F 17/30312 709/224 |
| 2017/0153888 | A1* | 6/2017 | Joglekar ............. G06F 8/73 |
| 2017/0185662 | A1* | 6/2017 | Huang ............ G06F 17/30569 |

OTHER PUBLICATIONS

Izquierdo, Javier Luis Cánovas, et al., "Discovering Implicit Schemas in JSON Data", ICWE 2013, Aalborg, Denmark, Jul. 8-12, 2013, pp. 68-83.*

(Continued)

*Primary Examiner* — Robert Stevens
(74) *Attorney, Agent, or Firm* — Duft & Bornsen, PC

(57) ABSTRACT

Systems and methods are provided for generating a GUI from multiple JavaScript Object Notation (JSON) files. One embodiment is a system that includes a memory storing multiple JSON files. Each JSON file stores JSON objects that each define a portion of a Graphical User Interface (GUI). The system also includes a controller that reviews dependency information within the JSON files to identify dependencies between JSON objects stored in the JSON files, determines an order for the JSON objects based on their dependencies, and generates a master JSON file by including JSON objects from each of the JSON files in the determined order.

20 Claims, 7 Drawing Sheets

(56) References Cited

OTHER PUBLICATIONS

Bray, Tim, (editor), "RFC 7159—The JavaScript Object Notation (JSON) Data Interchange Format", Internet Engineering Task Force (IETF), Standards Track, ISSN: 2070-1721, Mar. 2014, pp. 1-16.*
McMullen, T. H., et al., "Improving Platform Independent Graphical Performance by Compressing Information Transfer using JSON", SWWS, Athens, Greece, Apr. 2013, 7 pages.*
"Arrays as ordered lists or unordered sets", conversation opened by Ianthaler on Aug. 24, 2011, 2 pages.*
Rivera-Correa, Lefty A., et al., "Process JSON data with WebSphere Transformation Extender—Transform and validate JSON data", IBM developerWorks, © IBM Corporation 2012, pp. 1-17.*
Avdiu, Tony, et al., "Build a pureXML and JSON application, Part 2: Create Universal Services for pureXML that expose JSON", IBM developerWorks, © IBM Corporation 2010, pp. 1-15.*
Wang, Guanhua, "Improving Data Transmission in Web Applications via the Translation between XML and JSON", CMC 2011, Qingdao, China, Apr. 18-20, 2011, pp. 182-185.*
Microsoft Computer Dictionary, 4th Edition, Microsoft Press, Redmond, WA, © 1999, pp. 107-183.*
"JSON", Wikipedia, en.wikipedia.org/wiki/JSON, downloaded on Mar. 18, 2019, pp. 1-9.*
Microsoft Computer Dictionary, 5th Edition, Microsoft Press, Redmond, WA., © 2002 Microsoft Corp., pp. 152 and 252.*
"Dependency", Wikipedia, https://en.wikipedia.org/Dependency, downloaded on May 13, 2019, pp. 1-2.*
"Coupling (computer programming)", Wikipedia, https://en.wikipedia.org/ Coupling_(computer_programming), downloaded on May 13, 2019, pp. 1-4.*
Ecma International; Standard ECMA-404; The JSON Data Interchange Format; Oct. 2013, 14 pages.

* cited by examiner

FIG. 4

```
{
  "tabs":
  [
    {
      "sections":
      [
        {
          "properties":
          [
            {
              "tableNameKey": "label.inputdevices",
              "hasHeader": true,
              "sortColumn": {
                "sortCol": "InputDevice.ID",
                "sortAsc": true
              },
              "useLocationPreferences": true,
              "hasFavoritesColumn": true,
              "hasTableActions": true,
              "hasQuickSearch": true,
              "hasCheckboxColumn": true,
              "hasHeaderActions": true
            }
            {
              "key": "general.Printer.LastModified",
              "labelKey": "Printer.LastModified",
              "attributeID": "Printer.LastModified",
              "controller": "ui-base/control/controller/TextFieldController",
              "required": false
            },
            {
              "key": "general.Printer.CheckSystem",
              "labelKey": "Printer.CheckSystem",
              "attributeID": "Printer.CheckSystem",
              "controller": "ui-base/control/controller/TextAreaController",
              "required": false
            },
          ],
          "key": "section.general",
          "labelKey": "general.tab"
        }
      ],
      "key": "tab.general",
      "labelKey": "general.tab"
    }
  ]
}
```

410 — first property block (tableNameKey ... hasHeaderActions)
420 — second property block (Printer.LastModified)
430 — third property block (Printer.CheckSystem)
400 — overall

FIG. 5

```
{
  "positionedObjects":
  [
    {
      "position":
"AFTER:general.Printer.LastModified;BEFORE:general.Printer.CheckSystem",
      "key": "general.Printer.AvantiCostCenter",
      "labelKey": "Printer.AvantiCostCenter",
      "attributeID": "Printer.AvantiCostCenter",
      "controller": "ui-base/control/controller/PullDownController",
      "required": false
    }

{
      "tableId": "TableInfoAdminInputDevices",
      "includes": [
      "InputDevicesTableInfo"
      ], "defaultColumns": [
      {
         "key": "defaultColumns.InputDevice.ID",
         "id": "InputDevice.ID"
      }
      ],
    }
  ]
}
```

510 brackets the first object; 520 brackets the second object. 500 labels the overall block.

US 11,144,592 B2

1

EXTENDABLE JSON CONFIGURATION ARCHITECTURE

FIELD OF THE INVENTION

The invention relates to the field of JavaScript Object Notation (JSON).

BACKGROUND

JSON may be utilized to configure a number of different applications. For example, JSON may dictate the contents of a Graphical User Interface (GUI) that facilitates interaction with an application-layer program governing the operations of the computer system. A GUI may be provided by a print server via a website in order to enable a user to control how print jobs are stored, queued, and printed at a print shop.

JSON may be utilized to define each of multiple interactive elements (known as "controls") within the GUI. Different sets of controls within a GUI may be programmed by different parties. This complicates GUI creation because it means that multiple developers must coordinate their actions in order to collaboratively generate a single integral JSON file defining the GUI. If any of the developers mistakenly includes an error within the JSON file for the GUI, the entire GUI may crash.

Thus, designers of JSON content continue to seek out enhanced techniques that provide for flexibility and stability in design of applications that utilize JSON.

SUMMARY

Embodiments described herein provide techniques for merging JSON files into a "master" configuration file (e.g., for a GUI). This beneficially streamlines loading processes while also enabling developers to compartmentalize design. For example, one set of developers may focus on designing one part of a GUI without being concerned about the formatting of other JSON content used to generate the GUI.

One embodiment is a system that includes a memory storing multiple JavaScript Object Notation (JSON) files. Each JSON file stores JSON objects that each define a portion of a Graphical User Interface (GUI). The system also includes a controller that reviews dependency information within the JSON files to identify dependencies between JSON objects stored in the JSON files, determines an order for the JSON objects based on their dependencies, and generates a master JSON file by including JSON objects from each of the JSON files in the determined order.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

2

Figure 3:
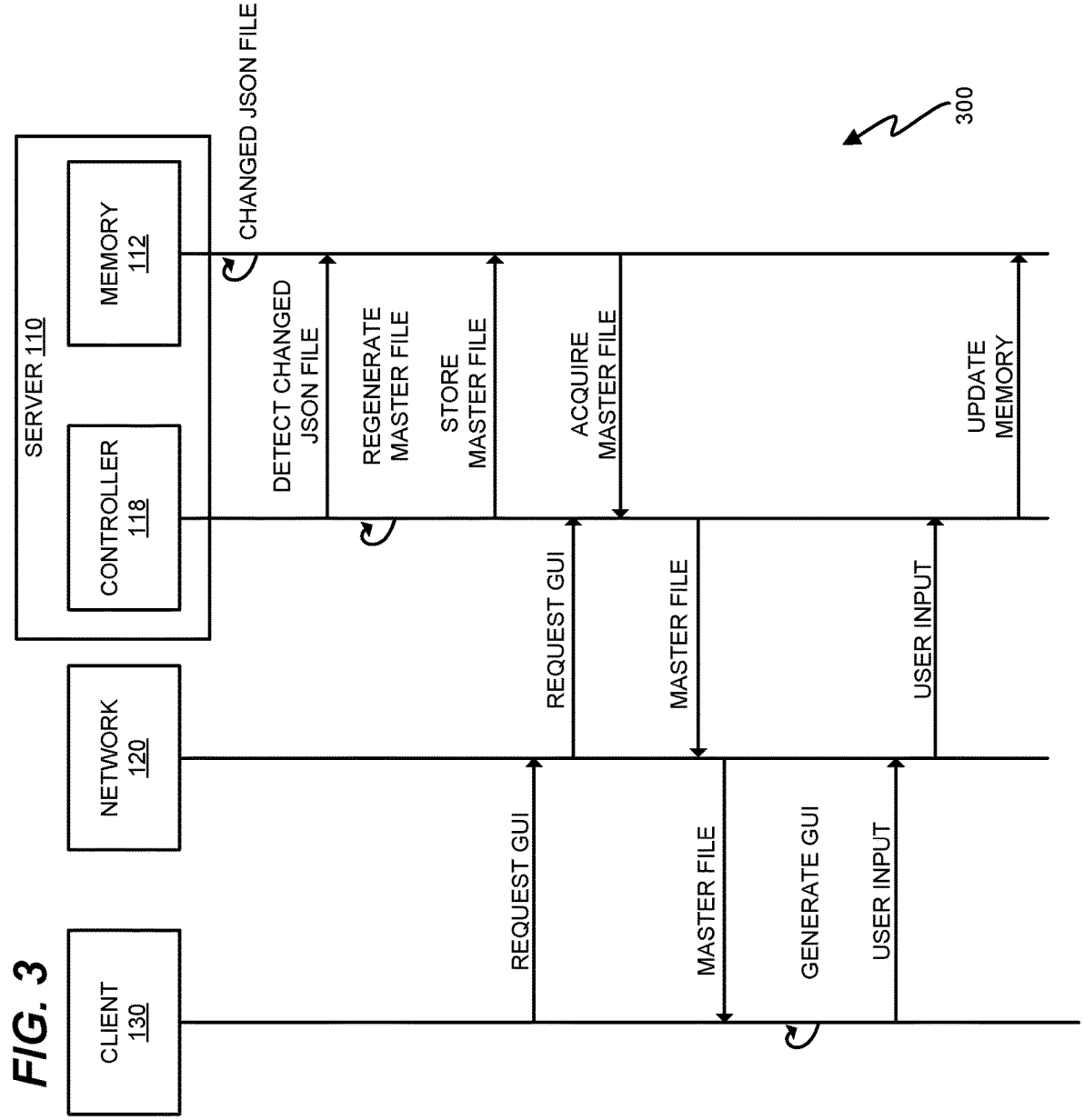

FIG. 3 is a message diagram illustrating exemplary operations performed for maintaining a master configuration file for a JSON GUI in an exemplary embodiment.

FIG. 4 illustrates a JSON file for a GUI in an exemplary embodiment.

FIG. 5 illustrates an additional JSON file for a GUI in an exemplary embodiment.

Figure 6:
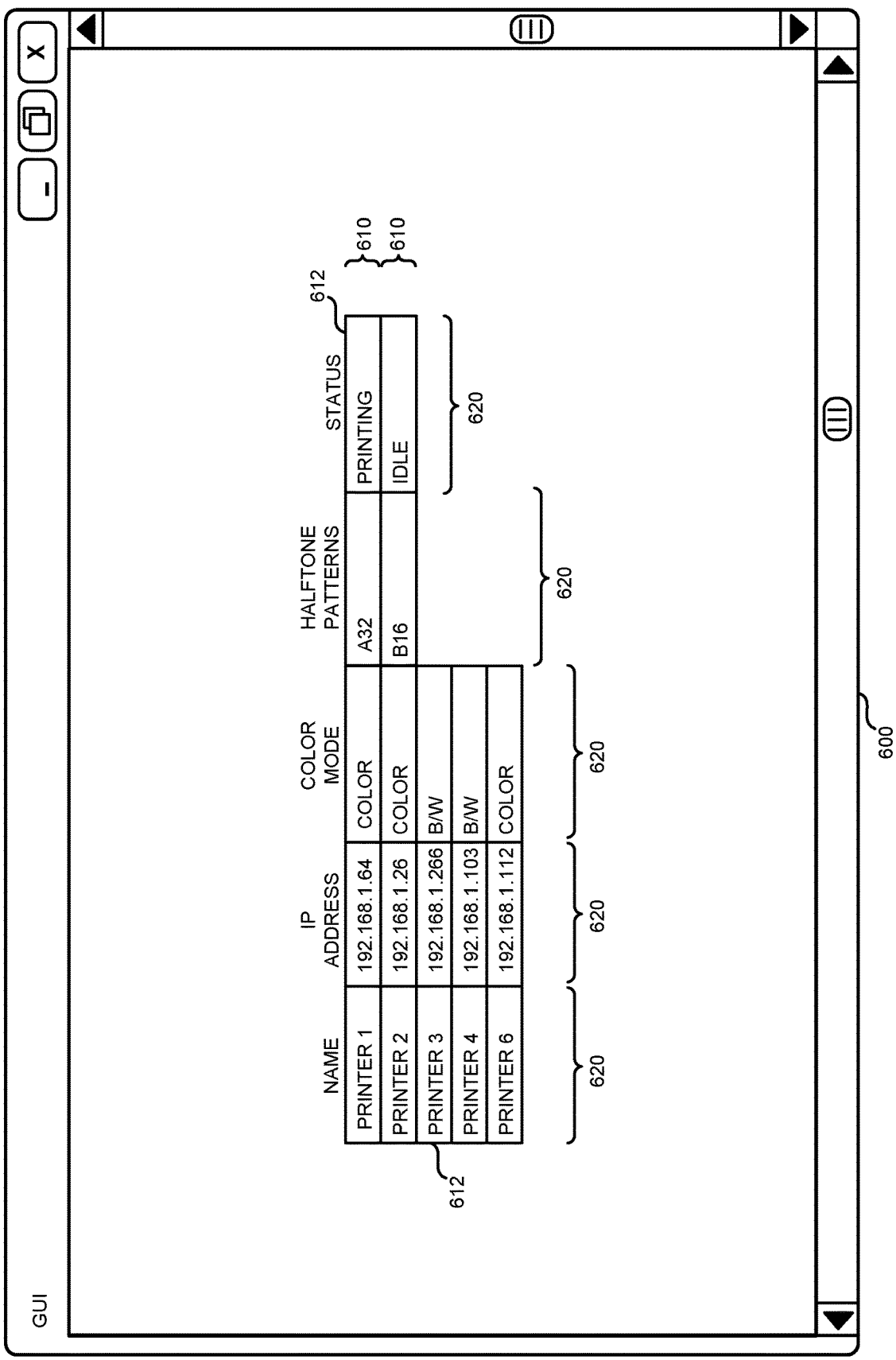

FIG. 6 illustrates an exemplary GUI generated based on a JSON file in an exemplary embodiment.

Figure 7:
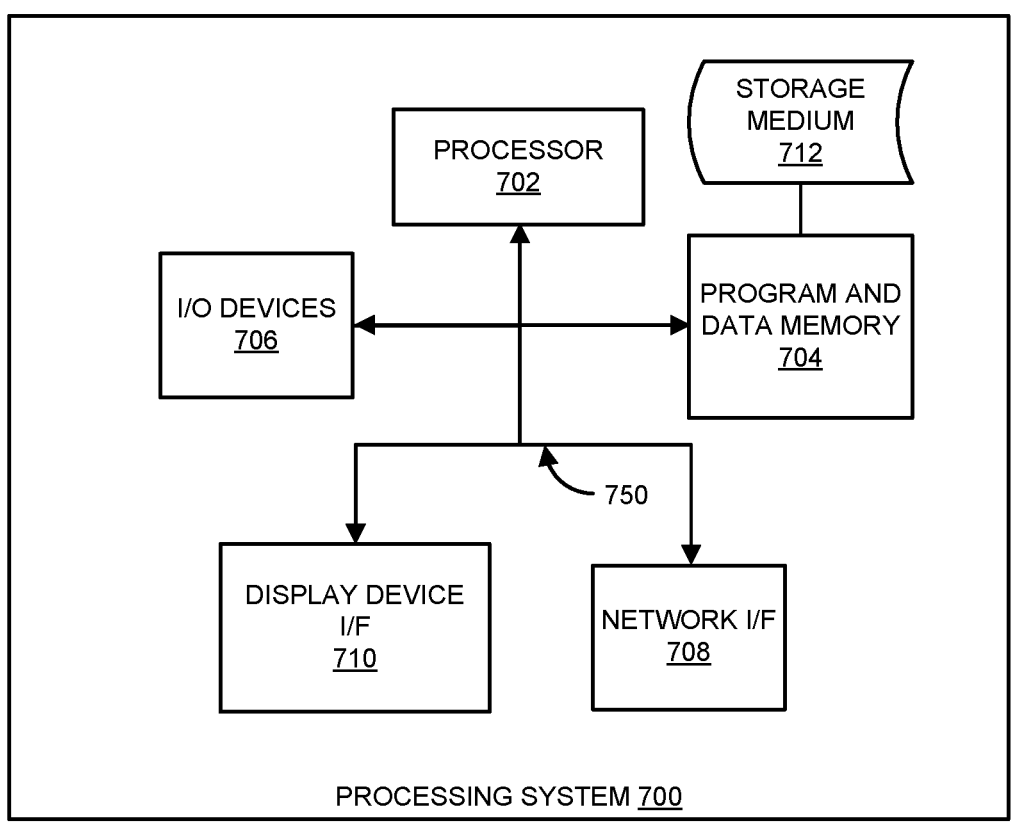

FIG. 7 illustrates a processing system operable to execute a computer readable medium embodying programmed instructions to perform desired functions in an exemplary embodiment.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
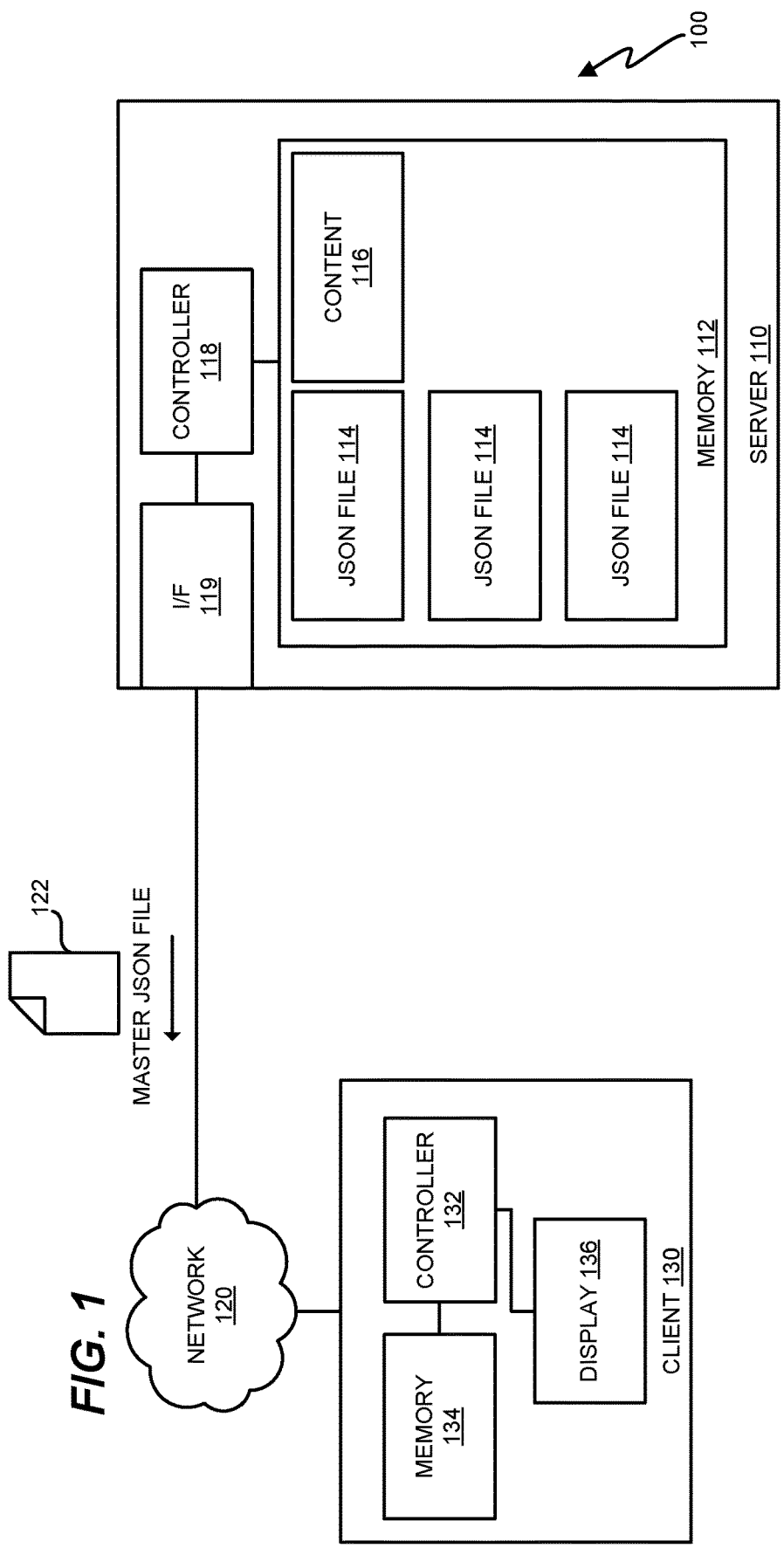
FIG. 1 is a block diagram of a network environment in an exemplary embodiment.

FIG. 1 is a block diagram of a network environment 100 in an exemplary embodiment. Network environment 100 comprises any systems, devices, or components operable to present a GUI to a user of a client device. In this embodiment, network environment 100 includes server 110. Server 110 includes memory 112 and controller 118. Controller 118 receives requests via network 120 to access server 110 (e.g., in order to manage content 116). In response to these requests, controller 118 generates a master JSON file 122. Master JSON file 122 includes JSON objects that define various components of a GUI. Master JSON file 122 may be used by client 130 to generate a GUI for interacting with content 116. Master JSON file 122 is transmitted to client 130 from interface (I/F) 119 via network 120. A browser (implemented by processor 132 and memory 134) then generates a JavaScript GUI based on the contents of master JSON file 122.

I/F 119 may comprise an Ethernet interface or other suitable component for transferring data. Controller 118 may be implemented as custom circuitry, as a processor executing programmed instructions, etc. The particular arrangement, number, and configuration of components described herein is exemplary and non-limiting. Illustrative details of the operation of network environment 100 will be discussed with regard to FIG. 2. Assume, for this embodiment, that client 130 is attempting to access content 116 (e.g., print jobs) stored at server 110.

Figure 2:
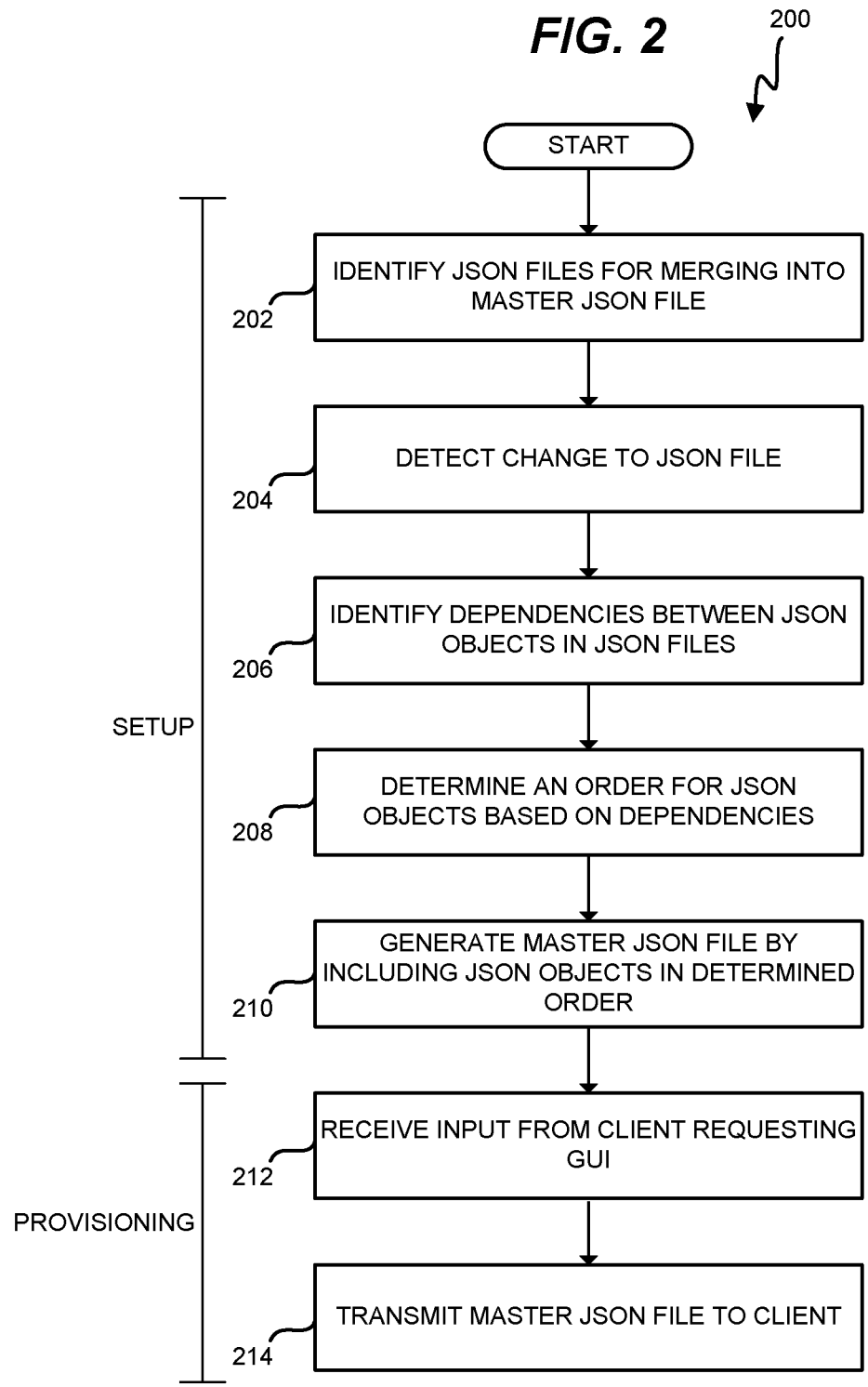
FIG. 2 is a flowchart illustrating a method for generating master configuration files for JSON GUIs in a network environment in an exemplary embodiment.

FIG. 2 is a flowchart illustrating a method 200 for operating network environment 100 in order to generate a GUI in an exemplary embodiment. The steps of method 200 are described with reference to network environment 100 of FIG. 1, but those skilled in the art will appreciate that method 200 may be performed in other systems. The steps of the flowcharts described herein are not all inclusive and may include other steps not shown. The steps described herein may also be performed in an alternative order.

Assume, for this embodiment, that memory 112 stores JSON files 114 in multiple directories. JSON standards are described, for example, in the JSON Data Interchange Format, ECMA-404 (1st Edition, October 2013), issued by ECMA international. These various JSON files may change depending on the configuration of server 110. For example, in embodiments where server 110 is a print server, each JSON file 114 may correspond with a printer that is coupled with server 110 for communication. The number of JSON files 114 may therefore change depending on the number and type of printers that are coupled for communication with server 110. JSON files 114 may be referred to as "extension" files because they serve to extend the content presented in a GUI, or the capabilities of a GUI.

The steps discussed herein include processes for regenerating or updating a master JSON file in response to changes in the file system of memory 112 (steps 202-210). The steps discussed herein also include processes for transmitting an updated master JSON file to a client for the creation of a GUI (steps 212-214).

As an initial process, controller 118 identifies JSON files 114 that will be merged together into master JSON file 122 (step 202). This process may involve detecting JSON files 114 that have the same file name (e.g., "PrinterColumns.json") in memory 112. It may alternatively involve detecting JSON files 114 that are stored in similar file locations. In one embodiment where server 110 is a print server, each JSON file 114 is associated with a printer and stored in a known directory for that printer.

Controller 118 monitors JSON files 114 in order to detect any changes to the contents of JSON files 114. At some point in time, JSON files 114 are altered. The alteration may be an update to an existing JSON file 114. The alteration may even include the creation of a new JSON file or the deletion of an old JSON file. These alterations may be performed by a technician as server 110 is updated. For example, in a print shop environment, a print shop operator may update JSON files 114 in response to a software update, in response to the installation of a new printer, or in response to the removal of an old printer. Controller 118 detects the change in at least one JSON file 114 (step 204). Since master JSON file 122 is based on the contents of JSON files 114, changes to JSON files 114 trigger the generation of a new version of master JSON file 122.

In order to prepare for the generation of a new master JSON file 122, controller 118 reviews the contents of each JSON file 114. Each JSON file 114 includes one or more JSON objects that define a control, label, field, or other portion of a GUI. As used herein, a control is an interactive element of a GUI capable of receiving user input. A label is statically defined data, and a field displays data at server 110 that may change over time. Some JSON objects include other JSON objects by reference, via a custom JSON include property. In one embodiment, the include property is a custom JSON name/value pair that refers to a JSON object to be included by reference. Other JSON objects may depend on JSON objects, as indicated by a custom JSON dependency property or other dependency information. In one embodiment, the dependency property is a custom JSON name/value pair that refers to a JSON object that is depended upon by the present JSON object. As used herein, a first JSON object is dependent upon a second JSON object if it should be processed after the second JSON object in order to avoid an error when generating a GUI. Controller 118 identifies dependencies between JSON objects in the directory (step 206). This step may be performed by analyzing the dependency properties of the JSON objects in each JSON file 114.

With the identities and dependencies of each JSON object known, controller 118 proceeds to determine an order for the JSON objects based on their dependencies (step 208). JSON objects having a defined dependency property may be ordered based on their key names (i.e., unique identifiers). For example, a first JSON object may indicate via its dependency property that it follows a JSON object having a key name of "RICOH-1." In one embodiment, JSON objects with no dependencies are ordered for placement at the beginning of the master JSON file 122, followed by JSON objects that only depend on already-placed JSON objects, and so on.

The combining and ordering of JSON objects in steps 206-208 is referred to as an intelligent merge. During the intelligent merge process, controller 118 analyzes each JSON file 114 to confirm that the file is written in accordance with JSON formatting standards (i.e., that the JSON objects within file 114 are compatible with JSON standards). If it is not, JSON objects within JSON file 114 may be discarded prior to sorting. This prevents processing errors that would otherwise occur during the combination of JSON files 114. Specifically, it prevents an improperly formatted file from halting the generation of a GUI.

Ascertaining a correct merge order remains important, because the order of JSON objects in the master JSON configuration file 122 determines how items are presented to the user in the GUI, affecting overall usability of the GUI. Controller 118 further generates master JSON file 122 (step 210). Master JSON file 122 integrates content from the JSON objects in JSON files 114. The order of the JSON objects in master JSON file 122 matches the order determined in step 208. Master JSON file 122 may be stored in memory 112. In short, JSON files 114 are inserted and/or merged together in master JSON file 122 based on key names in the JSON objects (as described above) as well as taking into consideration the location of JSON objects that have dependency relationships. After the intelligent merge is complete, the resulting master JSON file 122 is scanned for the presence of custom JSON include properties. The include property allows for a first JSON object to include the contents of another JSON object by reference. This prevents needless duplication of JSON information within file 122. Controller 118 also inserts custom JSON include properties into file 122 in order to eliminate duplicate JSON data within file 122. JSON objects within file 122 may further be scanned one last time to ensure that they are compatible with JSON standards. If a JSON object is not compatible, controller 118 removes the JSON object from file 122. In this manner as described in steps 202-210, file 122 may be rebuilt as part of a background process whenever one or more JSON files 114 are altered.

After the master JSON file 122 has been generated by controller 118, controller 118 begins monitoring for future changes to JSON files 114. If a further change is detected, controller 118 may return to step 202 in order to generate a new master JSON file 122. Controller 118 further monitors for requests from one or more clients 130.

Assume, for this embodiment, that no further changes have occurred to the master JSON file 122. Controller 118 proceeds to receive input from client 130 requesting information for generating a GUI at client 130 (step 212). Controller 118 retrieves master JSON file 122, and transmits this file via I/F 119 to client 130 via network 120 (step 214). Client 130 receives master JSON file 122. Browser of client 130 proceeds to generate a GUI based on file 122. For example, browser may generate a GUI label, field, or control for each JSON object listed in file 122.

A user may then interact with the GUI in order to generate user input for processing by server 110. Consider an embodiment where server 110 is a print server. A user may operate the GUI in order to submit, review, and/or revise print jobs for printing via one or more printers managed by the print server. In response to this input, server 110 may perform desired operations, such as generating print previews or printing a document.

FIG. 3 is a message diagram 300 illustrating exemplary operations performed for maintaining a master JSON file for a GUI in an exemplary embodiment. According to message diagram 300, controller 118 monitors memory 112 to determine whether or not a JSON file 114 has changed. In response to detecting a change, controller 118 initiates a master JSON file update process. This involves generating a new master JSON file 122, based on the changed JSON file 114. The new master JSON file 122 is stored in memory 112. At some point in time, client 130 requests instructions for generating a GUI. Therefore, controller 118 retrieves the new master file from memory 112, and provides the new master file to client 130 via network 120.

Client 130 generates a GUI based on the JSON objects in the master file, and provides user input to controller 118. Controller 118 then updates memory 112 based on this input. For example, in embodiments where server 110 is a print server, the user input may request that a print job stored in memory 112 be printed or revised. The user input may further request that a print preview be generated, or may simply provide updated information pertaining to a printer or print job. This user input may be stored in memory 112 by controller 118 and used to direct the operations of server 110.

EXAMPLES

In the following examples, additional processes, systems, and methods are described in the context of JSON files that may be merged together into a master JSON file.

FIG. 4 illustrates an exemplary JSON file 400 for generating a GUI in an exemplary embodiment. JSON file 400 includes multiple JSON objects (410, 420, 430). Each JSON object is bounded by "{" and "}" characters. Furthermore, each JSON object is associated with a unique key, and includes multiple pairs. Each pair includes a name (in the form of a string) and a value. For example, the name may be "hasQuickSearch" and the value may be "true." A single colon follows each name, to separate the name from the corresponding value. JSON file 400 includes three JSON objects in this embodiment. JSON object 410 defines a column listing printer input devices. The column will be added to a table describing properties of the printer. JSON object 420 defines a text field that indicates a date and time at which a printer was last modified. JSON 430 object is also included, which defines a text area in which to place "check system" results for a printer.

FIG. 5 illustrates a further JSON file 500 which may be combined with JSON file 400. JSON file 500 stores JSON object 510, which includes a custom JSON dependency property called "position." In this case, "position" does not refer to a location of a control on a GUI, but rather refers to an order in which to sort JSON object 510 among other JSON objects within a JSON master file. In this case, the dependency property indicates that JSON object 510 should be placed after a JSON object having a key name of "general.Printer.LastModified" (i.e., JSON object 420 of FIG. 4), and before a JSON object having a key name of "general.Printer.CheckSystem" (i.e., JSON object 430 of FIG. 4).

FIG. 5 further illustrates JSON object 520. JSON object 520 defines a custom JSON includes property. The includes property refers to a key that uniquely identifies another JSON object that will be included within a master JSON file. In this manner, when client 130 processes the includes property during the generation of a GUI, client 130 refers to the contents of the referenced JSON object. This ensures that JSON object 520 is properly processed during the creation of a master JSON file, while reducing the overall file size of master JSON file 122.

FIG. 6 illustrates an exemplary GUI 600 generated based on a master JSON file in an exemplary embodiment. GUI 600 includes information describing multiple printers. Information describing each printer is dedicated to a corresponding row 610. Each row 610 extends across multiple columns 620. Each row 610 includes multiple fields 612 that each correspond with a value for a specific property of the printer. The arrangement and location of each field 612 in GU 600 is defined by JSON objects in a JSON master file.

Embodiments disclosed herein can take the form of software, hardware, firmware, or various combinations thereof. In one particular embodiment, software is used to direct a processing system of network environment 100 to perform the various operations disclosed herein. FIG. 7 illustrates a processing system 700 operable to execute a computer readable medium embodying programmed instructions to perform desired functions in an exemplary embodiment. Processing system 700 is operable to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 710 may be integrated with the system to interface to one or more display devices, such as printing systems and screens for presentation of data generated by processor 702.

Although specific embodiments were described herein, the scope of the invention is not limited to those specific embodiments. The scope of the invention is defined by the following claims and any equivalents thereof.

We claim:

1. A system comprising:
  a memory storing multiple JavaScript Object Notation (JSON) files, each JSON file storing JSON objects that each define a portion of a Graphical User Interface (GUI); and
  a controller that reviews dependency information within the JSON files to identify dependencies between JSON objects stored in the JSON files, determines an order for the JSON objects based on their dependencies, and generates a master JSON file by including JSON objects from each of the JSON files in the determined order.

2. The system of claim 1 wherein:
  the JSON objects include other JSON objects by reference.

3. The system of claim 1 wherein:
  each of the JSON objects defines a location for an element of the GUI.

4. The system of claim 1 wherein:
  the controller further identifies changes to the JSON files, and generates a new master JSON file in response to identifying the changes.

5. The system of claim 1 wherein:
  the dependency information comprises a custom JSON name/value pair, within a JSON object, that refers to another JSON object.

6. The system of claim 1 wherein:
  the controller reviews the JSON objects for compatibility with JSON standards, and removes JSON objects that are not compatible with JSON standards from the master JSON file.

7. The system of claim 1 wherein:
  a dependency of a first JSON object upon a second JSON object means that the first JSON object should be processed after the second JSON object in order to avoid an error when generating the GUI.

8. A method comprising:
  identifying multiple JavaScript Object Notation (JSON) files for merging into a master JSON file, each JSON file storing JSON objects that each define a portion of a Graphical User Interface (GUI);
  reviewing dependency information within the JSON files to identify dependencies between JSON objects stored in the JSON files;
  determining an order for the JSON objects based on their dependencies; and
  generating a master JSON file by including JSON objects from each of the JSON files in the determined order.

9. The method of claim 8 wherein:
  the JSON objects include other JSON objects by reference.

10. The method of claim 8 wherein:
  each of the JSON objects defines a location for an element of the GUI.

11. The method of claim 8 further comprising:
  identifying changes to the JSON files;
  generating a new master JSON file in response to identifying the changes.

12. The method of claim 8 further comprising:
  the dependency information comprises a custom JSON name/value pair, within a JSON object, that refers to another JSON object.

13. The method of claim 8 further comprising:
  reviewing the JSON objects for compatibility with JSON standards; and
  removing JSON objects that are not compatible with JSON standards from the master JSON file.

14. The method of claim 8 wherein:
  a dependency of a first JSON object upon a second JSON object means that the first JSON object should be processed after the second JSON object in order to avoid an error when generating the GUI.

15. A non-transitory computer readable medium embodying programmed instructions which, when executed by a processor, are operable for performing a method comprising:
  identifying multiple JavaScript Object Notation (JSON) files for merging into a master JSON file, each JSON file storing JSON objects that each define a portion of a Graphical User Interface (GUI);
  reviewing dependency information within the JSON files to identify dependencies between JSON objects stored in the JSON files;
  determining an order for the JSON objects based on their dependencies; and
  generating a master JSON file by including JSON objects from each of the JSON files in the determined order.

16. The medium of claim 15 wherein:
  the JSON objects include other JSON objects by reference.

17. The medium of claim 15 wherein:
  each of the JSON objects defines a location for an element of the GUI.

18. The medium of claim 15 wherein the method further comprises:
  identifying changes to the JSON files;
  generating a new master JSON file in response to identifying the changes.

19. The medium of claim 15 wherein the method further comprises:
  the dependency information comprises a custom JSON name/value pair, within a JSON object, that refers to another JSON object.

20. The medium of claim 15 wherein the method further comprises:
  reviewing the JSON objects for compatibility with JSON standards; and
  removing JSON objects that are not compatible with JSON standards from the master JSON file.

* * * * *